Jan. 26, 1932.   F. C. KRANZ   1,842,988
MILL PROVIDED WITH A CONICAL RUNNER
Filed April 5, 1929
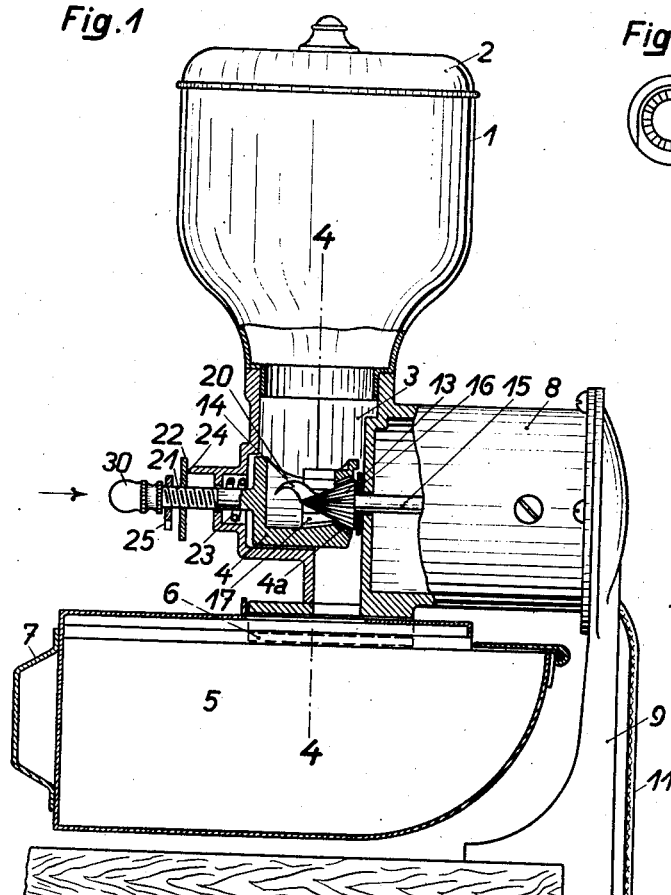
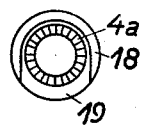
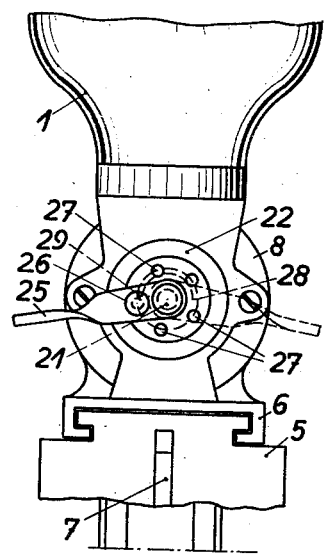
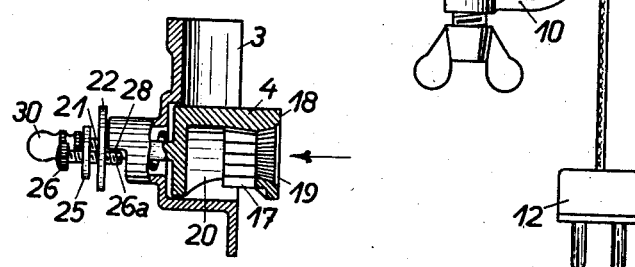
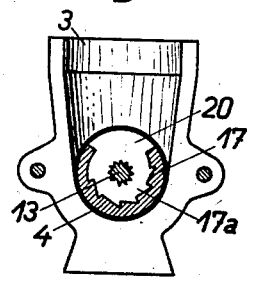
F. C. Kranz
INVENTOR Patented Jan. 26, 1932

1,842,988

UNITED STATES PATENT OFFICE

FRIEDRICH CLEMENS KRANZ, OF DRESDEN, GERMANY

MILL PROVIDED WITH A CONICAL RUNNER

Application filed April 5, 1929, Serial No. 352,837, and in Germany April 5, 1928.

Mills provided with a conical runner acting within a stationary casing are known, the casing being formed so that a part of it constitutes a conical grinding jacket cooperating with the conical runner while another connecting part acts with the point of the cone as preparatory grinder.

Mills of this type have been used for grinding coffee, cocoa, beans, spices and the like.

The present invention relates to a mill of this kind intended chiefly for grinding coffee and consists in arranging the conical grinding jacket at the end of a hollow cylinder designed as a valve body and adapted to slide longitudinally and to turn within the cylinder wall, the hollow cylinder being provided with an inlet opening for the material to be ground.

In power-operated mills the runner will attain a very high speed immediately after starting. If the runner or its preparatory grinder were expected to handle a full charge of material at once, the high speed at which the runner is moving would prevent the material from being taken on. On the other hand, if, according to the invention, the runner is inserted in a valve body forming a hollow cylinder and possessing an inlet for the material to be ground, the motor can be started while the valve is in closed position, whereupon the valve can be opened a little at a time to permit the gradual entrance of material to the grinding unit and to insure continuous feeding.

Preferably the conical grinding jacket cooperating with the conical runner is connected in the known manner with a toothing on the inside of the hollow cylinder, which cooperates with the conical point of the runner projecting into it for preparatory grinding purposes, the arrangement comprising further a conveyor worm or the like which feeds the material within the hollow cylinder during the rotation of the runner to the preparatory grinder or the grinding units.

The invention is illustrated in the following drawings, in which

Figure 1 is a side view, partly in vertical section;

Figure 2, a front view in the direction of the arrow in Fig. 1;

Fig. 3, a vertical longitudinal section of Fig. 1 showing the casing in a different position;

Fig. 4, a vertical cross section on the line 4—4, Fig. 1, through the casing; and Fig. 5, a detail view.

Referring to the drawings, 1 is the hopper and 2 the cover thereof. Below the hopper 1 the casing 3 is arranged, in which the hollow cylinder 4 carrying the grinding jacket 4a is positioned so that it can slide longitudinally and turn. Below the casing the box 5 is arranged slidingly in the guides 6 and fitted with the handle 7 by means of which the box 5 can be drawn out when filled.

The casing 3 is followed immediately by the motor casing 8 which like the entire mill is carried by the arm 9, the lower end of which form the screw clamp 10 for securing the mill in the known manner to a table T. The motor, which is not shown in the drawings, is supplied with current by means of the cord 11 and the plug 12.

The conical runner 13 carrying a conveyor worm 14 near its tip is secured to the motor shaft 15. The gasket-ring 16 prevents the ground material from entering the motor casing.

On its travel through the mill the material to be ground is caught first by the conveyor worm 14 and guided to the preparatory grinding toothing 17, the center of whose pitch circle being arranged eccentrically to the center axis of the runner so that between the toothing and the runner a funnel-like gap 17a is formed which narrows down gradually and into which the material is drawn. After passing through the preparatory grinder the material is triturated between the conical runner 13 and the stationary grinding jacket 4a. A projecting rim 18 surrounding the grinding jackets on three sides protects the runner from the material not yet ground while the lower side is provided with the recess 19 as an outlet for the ground material.

The hollow cylinder 4 is provided with an inlet opening 20 comprising part of its surface and is capable of being turned about a certain angle such as 180° so as to close the inlet completely or, in another position, to open it fully. Before starting the mill the inlet is closed whereupon the motor is started and the inlet slightly opened so as to admit only a few beans or grains at a time. The latter will be readily taken on by the grinding units while, if the inlet were fully opened in the beginning, both the runner and the conveyor worm would throw back the material without working it. This can be avoided by opening the inlet 20 gradually. Turning and axial shifting of the hollow cylinder 4 take place as follows:

Screwed on to the spindle 21 is a nut 22, and a spring 23 draws the spindle inside the grinding casing as far as the stop 24 hugged by the nut permits. By turning the nut the axial adjustment of the grinding jacket and thus the inside width of the gap between the runner and the grinding packet i. e., the fineness of grinding, can be regulated.

Rigidly connected with the spindle 21 is the handle 25 which carries a threaded stop 26 adapted to pass through concentrically arranged recesses 27 in the nut 22. After adjusting the desired degree of grinding fineness the stop 26 is screwed forward until it penetrates one of the recesses 27. Its end 26a projecting on the other side coacts with two stops 28 and 29 provided on the casing 3 so that the two stops fix the two extreme positions of the hollow cylinder 4, namely, the complete opening and closing of the inlet 20. The passage of the pin 26 through the recesses 27 serves the purpose of rigidly connecting the nut 22 with the spindle as long as no other adjustment of the degree of grinding fineness is wanted. To facilitate operation a handle 30 is secured to the spindle.

In Fig. 2 the two extreme positions of the handle 25 are shown; Figs. 1 and 4 disclose the inlet 20 in fully opened position while Fig. 3 shows it in completely closed position.

Fig. 5 shows a side view of the grinding jacket seen in the direction of the arrow in Fig. 3.

Having now particularly described and ascertained the nature of my said invention and in what manner the same is to be performed, I declare that what I claim is:—

1. A mill including a casing having an internal chamber, inlet and outlet openings communicating with said chamber, a hollow grinding element located in said chamber and having an open end adapted to deliver material to the outlet opening, a rotatable grinding element located in the open end of the first mentioned grinding element, the first mentioned grinding element being mounted for rotary and axial movement in said chamber and having an opening therein movable into registration with the inlet opening of the casing, said first mentioned grinding element being movable to a position to completely cut off flow of material thereinto from the inlet opening of the casing.

2. A mill as claimed in claim 1, characterized by the provision of means normally urging the first mentioned grinding element axially toward the rotary grinding element, and means for variably limiting said movement of the first mentioned grinding element.

3. A mill as claimed in claim 1, characterized by the provision of means for manually effecting adjustment of the first mentioned grinding element, and stops for limiting the movement of the last mentioned means.

4. A mill as claimed in claim 1, characterized by the provision of means normally urging the first mentioned grinding element axially toward the rotary grinding element, and means for variably limiting said movement of the first mentioned grinding element, means for manually effecting adjustment of the first mentioned grinding element, and stops for limiting the movement of the last mentioned means.

In testimony whereof I have signed my name to this specification.

FRIEDRICH CLEMENS KRANZ.